Jan. 30, 1962  J. P. SOHN  3,019,324
ELECTRIC HEATER
Filed April 27, 1960  2 Sheets-Sheet 1
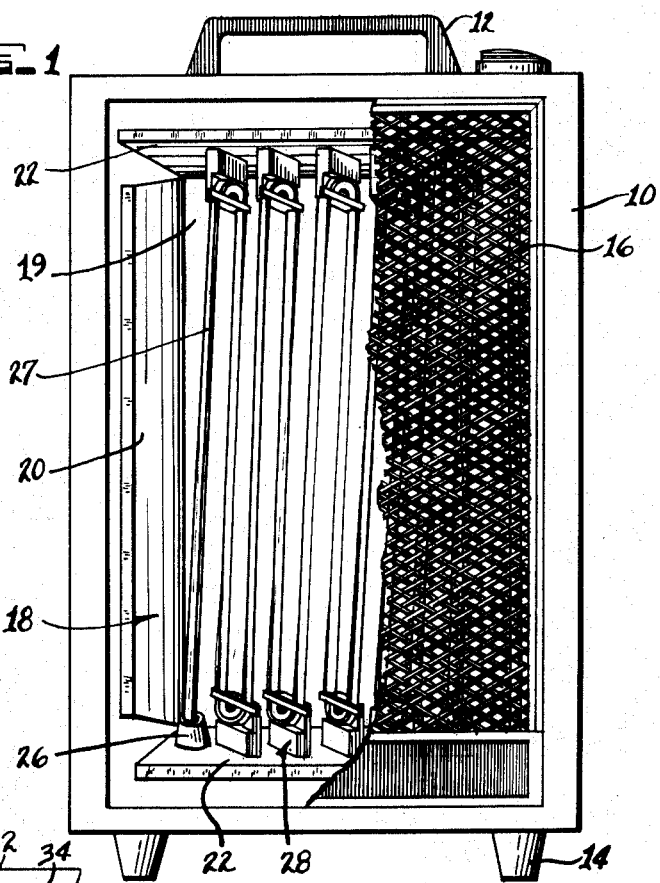
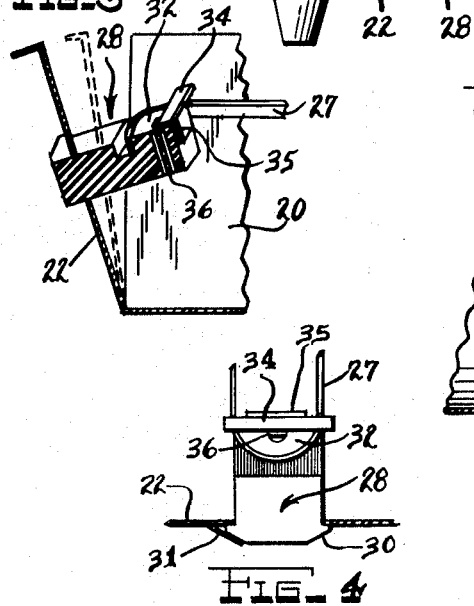
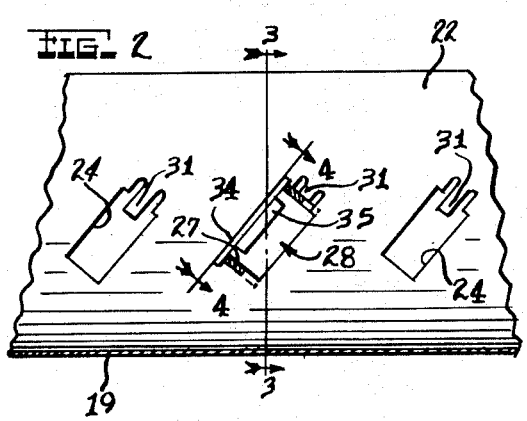
INVENTOR.
JOHN P. SOHN,
BY
ATTORNEYS.

Jan. 30, 1962 J. P. SOHN 3,019,324
ELECTRIC HEATER
Filed April 27, 1960 2 Sheets-Sheet 2
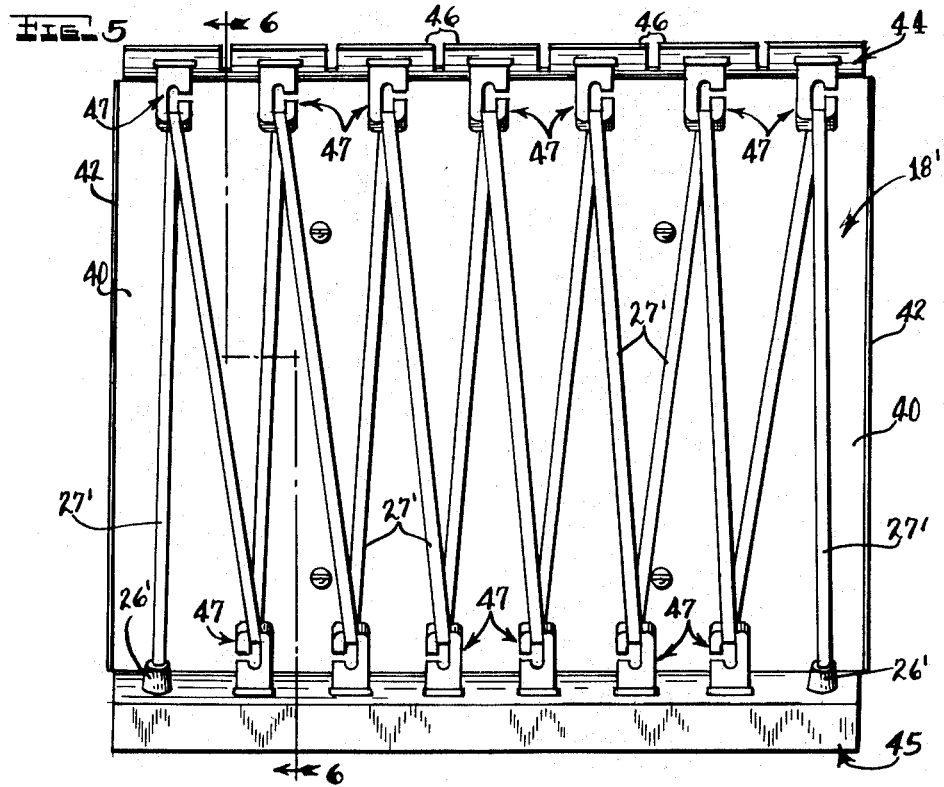
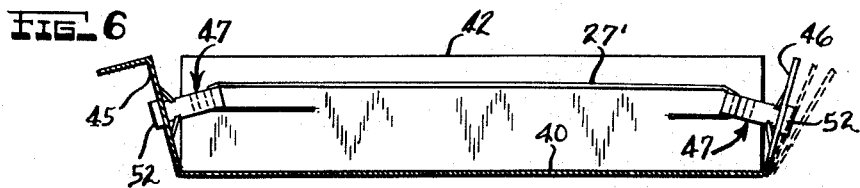
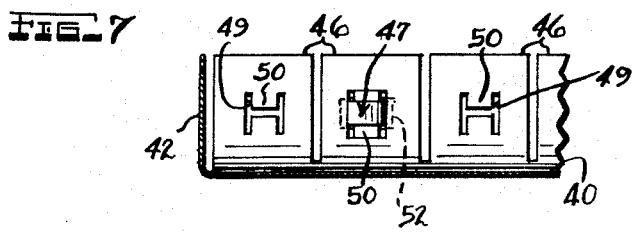
INVENTOR.
JOHN P. SOHN,
BY
ATTORNEYS.

United States Patent Office 3,019,324
Patented Jan. 30, 1962

3,019,324
ELECTRIC HEATER
John P. Sohn, Columbus, Ind., assignor to Arvin Industries, Inc., Columbus, Ind., a corporation of Indiana
Filed Apr. 27, 1960, Ser. No. 25,066
9 Claims. (Cl. 219—34)

This invention relates to an electric heater, and more particularly to an electric heater having an elongated flexible resistance heating element.

It is an object of my invention to provide an electric heater which is adapted to use an elongated flexible heating element, which will compensate for the expansion and contraction of said heating element to hold said element taut, which will effect such compensation without the necessity of employing a plurality of coil springs, and which can be easily and economically manufactured.

According to the preferred form of my invention, there is provided a conventional electric heater housing having an open forwardly presented face. A reflector is mounted in said housing for directing heat outwardly therefrom, and is provided with a pair of forwardly projecting flanges along a pair of its opposed edges. Each of said pair of flanges is provided with a plurality of spaced openings adapted to receive and hold a plurality of insulators.

Conveniently, the heating element for the heater may comprise a unitary elongated ribbon of metal fixedly mounted to a pair of said insulators at its ends, and movably mounted on the other of said plurality of insulators at a plurality of points along its length. The heating element is mounted on the insulators in a manner to retain the pair of flanges stressed toward each other when said element is in its normal contracted state, whereby heating and cooling of said element with its resulting contraction and expansion will cause said flanges to move away from and toward each other to thus retain said element taut when it is in both expanded and contracted positions.

Other objects and features of my invention will become apparent from the more detailed description which follows and from the accompanying drawings, in which:

FIG. 1 is a front elevation of an electric heater embodying my invention, with portions of the front face of said heater being broken away;

FIG. 2 is an enlarged fragmentary view of one of the reflector flanges showing an insulator mounted thereon and a pair of insulator mounting openings formed therein;

FIG. 3 is a generally vertical section taken on the line 3—3 of FIG. 2;

FIG. 4 is a section taken on the line 4—4 of FIG. 2, and showing an insulator in plan;

FIG. 5 is a front elevation of a modified form of my invention;

FIG. 6 is a vertical section taken on the line 6—6 of FIG. 5; and

FIG. 7 is a fragmentary view similar to FIG. 2, but showing one of the flanges on the reflector illustrated in FIG. 5.

As illustrated in the drawings, my invention comprises an electric heater which can be mounted in any desired type of conventional heater housing 10. Such a housing in a portable type heater is conventionally provided with a handle 12, supporting feet 14, and a protective grill 16 disposed over its open forwardly presented front face.

In the modification of my invention illustrated in FIG. 1, I employ a reflector 18, conveniently formed from sheet-metal and adapted to direct the heat forwardly from the heater through the grill 16. The reflector 18 comprises a major reflective surface 19 and a pair of forwardly projecting flanges 20 disposed along a pair of its opposed sides. A second pair of forwardly projecting flanges 22 extend along the other pair of opposed edges of the reflective surface 19. As shown in FIG. 2, each of the flanges 22 is provided with a plurality of openings 24 disposed at an oblique angle to the general plane of the forwardly presented face of the heater housing 10. Adjacent each of its ends, one of the flanges 24 is provided with any convenient size opening adapted to receive an insulator 26 for fixedly mounting and electrically connecting the ends of an elongated heating element 27 to a power source. As shown in FIG. 1, the heating element 27 is a narrow ribbon of metal fixedly connected at its ends to the insulators 26 and strung in a sinuous path around a plurality of insulators 28 carried in the flange openings 24 and thus mounting the element on said flanges.

As shown in FIGS. 3 and 4, each of the insulators 28 comprises a block of insulating material having a pair of outwardly projecting lips 30 formed on one of its ends and abutting the outer face of a flange 22 adjacent the opening in which the insulator is received. The lips are held in such abutting position by an ear 31 struck outwardly from the flanges adjacent each opening 24 and bearing against one of the lips. A recessed arcuate shoulder 32 is provided at the opposite end of the insulator around which the heating element 27 is slidably looped. The element is slidably retained on said shoulder by a generally T-shaped clip having an upper arm 34 and finger 35 extending across the upper and inwardly presented faces of the shoulder 32 and extending outwardly beyond the looped portion of the heating element 27 received over said shoulder. The cross arm 34 is connected to a tongue 36 extending downwardly through an opening formed in the shoulder 32, which together with the finger 35, permits the clip to be press-fit over said shoulder. With the openings 24 being disposed at an oblique angle to the forwardly presented heater face, the broad face of the heating element 27 between the insulators 28 will be presented forwardly, and thus generally parallel to the front face of the heater, to direct the heat forwardly from the element 27 and out the front heater face.

During heating and cooling of the element 27, said element will expand and contract in length. Thus, in order to keep the several runs of the element taut during both its expansion and contraction, the element 27 is mounted on the insulators 26 and 28 when it is in its normal contracted position. The ratio between the length of the element 27 in its contracted state and the distance between the flanges 22 is such that with the ends of the element fixedly mounted on the insulators 26, and its intermediate portion mounted on the insulators 28, the flanges 22 will be stressed inwardly toward each other against their inherent resiliency tending to urge them outwardly away from each other. Thus, as shown in FIG. 3, when the element 27 is in its normally retracted position, one or both of the flanges 22 will be disposed in the dotted line position shown in FIG. 3. But when the element 27 is heated with its resultant expansion, the inherent resiliency of the flanges 22 will cause said flanges to move outwardly into the full line position shown to thus retain the element 27 taut in its heated expanded position. Due to the curve of the shoulders 32 on the insulating blocks 28, the loops of the element 27 received over said shoulders will be slidable thereon to thus equalize the tension of the several runs of the element 27 between the several insulators 28 during the expansion and contraction of said element.

A modified form of my invention is illustrated in FIG. 5. This modification is adapted to be used in heaters where the rear and upper faces of the reflector 18′ may be scrubbed with fresh air, or where there is no necessity for maintaining the top of the heater cooled. In such modification, the reflector 18′, conveniently formed from sheet-metal, comprises a major reflecting surface 40 having a pair of forwardly projecting flanges 42 disposed along a pair of its opposed edges. A second pair of forwardly projecting flanges 44 and 45 extend along the other pair of opposed edges of the reflector surface 40. At least one of said pair of flanges, as shown flange 44, is slit at spaced intervals to provide a plurality of individual flange sections 46. In this modification, the resistance element 27' is also fixedly connected at each of its ends to a pair of insulators 26' mounted on one of the flanges 44 or 45 adjacent the ends thereof. Between the insulators 26', the heating element 27' is strung in a sinuous path over a plurality of insulators 47 mounted on flanges 44 and 45. As shown, each of the sections 46 on the flange 44 is provided with one of the insulators 47.

As shown in FIGS. 5 and 7, each of the insulators 47 is received in a generally H-shaped opening 49 with edges of the intermediate portions of said opening constituting a pair of ears 50. Each of the insulators is forced through one of the openings 49 and is retained therein by an outwardly projecting shoulder 52 formed on said insulator and abutting the outer face of the flange adjacent the opening 49 in which it is received. As the insulator is pushed through said opening, the ears 50 are received in a pair of transversely extending grooves formed in the opposed faces of the insulator 47 so that the ears 50 and the shoulder 52 thus hold each of the insulators in a fixed position in its flange opening 49, as shown in FIG. 6. The inwardly presented end of each of the insulators 47 has a generally C-shaped configuration, and is thus adapted to have the element 27' looped therearound. There will, of course, be some sliding movement of the element 27' on the insulators 47, but due to relatively sharp angles on the inwardly presented ends of the insulators, such sliding movement will not occur to the degree as in the other modification of my invention wherein the loops of the heating element 27 are slidable around the smooth curves of the insulator shoulder 32.

As in the other modification of my invention, the ratio of the length of the heating element 27' to the distance between the flanges 44 and 45 is such that with the ends of the element 27' fixedly secured to the insulators 26', and the intermediate portion of said heating element looped over the several insulators 47, the pair of flanges 44 and 45 will be stressed inwardly toward each other against their inherent resiliency. To compensate for any slack in the individual runs of the element 27', the fingers 46 may be bent independently of each other to thus assure a tension on the several runs of the element 27' when it is in its normally contracted position. As with the other modificaion of my invention, when the element 27' is heated it will expand and the flange 45 and the flange sections 46 will thus be free to move outwardly to retain the several runs of the element 27' taut.

While I have described my invention as employing a heating element having a plurality of runs undulating across the forward face of a reflector, it should be understood that my invention may be employed where the heating element has only a single run and/or where the heating element is in the form of a wire.

I claim as my invention:

1. In an electric heater, a sheet-metal reflector mounted in a heater housing and directing heat outwardly therefrom, said reflector having a centrally disposed, generally planar reflective surface and a pair of flanges projecting forwardly from said surface along a pair of its opposed edges, each of said flanges being bendable about a rectilinear bend line, a plurality of insulators mounted on said pair of flanges and projecting inwardly therefrom, and an elongated heating element mounted on said insulators forwardly of said centrally disposed reflective surface and disposed wholly within the extent of the reflector, said element retaining the pair of flanges stressed toward each other when it is in its normal contracted state, whereby upon heating and cooling of said element with its resultant expansion and contraction said flanges will move away from and toward each other about said rectilinear bend lines for retaining said element taut in both its expanded and contracted positions.

2. The invention as set forth in claim 1 in which the ends of said element are fixedly connected to a pair of said insulators, said element being slidably mounted on the other of said plurality of insulators at a plurality of spaced points intermediate its length.

3. The invention as set forth in claim 2 in which said other of said plurality of insulators are mounted on said flanges oblique to the general plane of the forwardly disposed face of the heater and said element is in the form of a metal ribbon strung between said insulators in a sinuous pattern with its major faces presented forwardly over a substantial portion of its length.

4. The invention as set forth in claim 2 in which each of said other of said plurality of insulators comprises a block of insulating material carried in an opening in one of said pair of flanges, a pair of lips on one end of said block adapted to abut the outer face of said flange adjacent said opening, a curved shoulder at the end of said block opposite the lips for the reception of said element, and means for holding said element on said shoulder in sliding engagement therewith.

5. The invention as set forth in claim 4 in which the flanges are provided with outwardly struck ears at said openings engageable with the lips on said insulators for holding said insulators in the flange openings.

6. In an electric heater, a sheet-metal reflector mounted in a heater housing and directing heat outwardly therefrom, said reflector having a centrally disposed reflective surface and a pair of flanges projecting forwardly from said surface along a pair of its opposed edges, a plurality of insulators mounted on said pair of flanges and projecting inwardly therefrom, and an elongated heating element mounted on said insulators forwardly of said centrally disposed surface, said element retaining the pair of flanges stressed toward each other when it is in its normal contracted state, whereby upon heating and cooling of said element with its resultant expansion and contraction said flanges will move away from and toward each other about their connections to said reflective surface for retaining said element taut in both its expanded and contracted positions, at least one of said flanges comprising a plurality of individually movable sections and one of said insulators is mounted on each of said sections, the ends of said element being fixedly mounted to a pair of said plurality of insulators and the other of said plurality of insulators being movably connected to said element at a plurality of spaced points intermediate its ends.

7. The invention as set forth in claim 6 in which each of said other of said plurality of insulators comprises a block of insulating material carried in an opening in one of said flanges, the inwardly presented end of each of said blocks being generally C-shaped for the reception of said element, and the outwardly presented end of said block having a pair of lips engageable with the outer flange face, and means for holding said blocks in fixed positions in the flange openings.

8. The invention as set forth in claim 7 in which said means comprises pairs of ears on said flanges adjacent the block openings therein and receivable in grooves formed in said blocks.

9. In an electric heater, a sheet-metal reflector mounted in a heater housing and directing heat outwardly therefrom, said reflector having a centrally disposed, generally planar reflective surface and a pair of flanges projecting forwardly therefrom along a pair of opposed edges of said surface, at least one of said pair of flanges being bendable toward and away from the other of said flanges along a fixed rectalinear bend line, a plurality of insulators mounted on said pair of flanges and porjecting inwardly therefrom, and an elongated heating element mounted on said insulators forwardly of said centrally disposed reflective surface and disposed wholly within the extent of the reflector, said element retaining said one of flanges stressed toward said other flange when it is in its normal contracted state, whereby upon heating and cooling of said element with its resultant expansion and contraction said one flange will move from and toward said other flange about said bend line for retaining said element taut in both its expanded and contracted positions.

References Cited in the file of this patent

UNITED STATES PATENTS

| | | |
|---|---|---|
| 533,795 | Edwards | Feb. 5, 1895 |
| 1,014,161 | Madsen | Jan. 9, 1912 |
| 1,023,475 | Madsen | Apr. 16, 1912 |
| 1,065,015 | Youmans | June 17, 1913 |
| 2,005,364 | Derringer | June 18, 1935 |
| 2,102,097 | Sherman | Dec. 14, 1937 |
| 2,462,607 | Browne | Feb. 22, 1949 |
| 2,548,511 | Anderson | Apr. 10, 1951 |
| 2,668,220 | Spurr | Feb. 2, 1954 |
| 2,685,633 | Olson et al. | Aug. 3, 1954 |
| 2,912,661 | Balestrini | Nov. 10, 1959 |

FOREIGN PATENTS

| | | |
|---|---|---|
| 481,044 | France | Aug. 1, 1916 |
| 309,376 | Great Britain | Apr. 11, 1929 |

UNITED STATES PATENT OFFICE
CERTIFICATE OF CORRECTION

Patent No. 3,019,324                      January 30, 1962

John P. Sohn

It is hereby certified that error appears in the above numbered patent requiring correction and that the said Letters Patent should read as corrected below.

Column 5, line 1, for "porjecting" read -- projecting --; line 5, after "of", second occurrence, insert -- said --.

Signed and sealed this 5th day of June 1962.

(SEAL)
Attest:

ERNEST W. SWIDER
Attesting Officer

DAVID L. LADD
Commissioner of Patents